(12) United States Patent
Kokubo et al.

(10) Patent No.: US 10,818,283 B2
(45) Date of Patent: Oct. 27, 2020

(54) SPEECH RECOGNITION SYSTEM, TERMINAL DEVICE, AND DICTIONARY MANAGEMENT METHOD

(71) Applicant: Clarion Co., Ltd., Saitama-shi, Saitama (JP)

(72) Inventors: Hiroaki Kokubo, Tokyo (JP); Takuya Matsumoto, Hadano (JP); Norio Watarai, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 252 days.

(21) Appl. No.: 16/027,500

(22) Filed: Jul. 5, 2018

(65) Prior Publication Data

US 2019/0013010 A1    Jan. 10, 2019

(30) Foreign Application Priority Data

Jul. 6, 2017   (JP) .................. 2017-132708

(51) Int. Cl.
*G10L 15/30* (2013.01)
*G10L 15/06* (2013.01)
(Continued)

(52) U.S. Cl.
CPC .............. *G10L 15/06* (2013.01); *G10L 15/02* (2013.01); *G10L 15/187* (2013.01);
(Continued)

(58) Field of Classification Search
CPC ........ G10L 15/30; G10L 15/19; G06F 40/232
See application file for complete search history.

(56) References Cited

U.S. PATENT DOCUMENTS

| | | | |
|---|---|---|---|
| 5,867,812 A * | 2/1999 | Sassano | G06F 40/247 704/10 |
| 2004/0010409 A1* | 1/2004 | Ushida | G10L 15/30 704/246 |
| 2012/0173574 A1* | 7/2012 | Homma | G06F 16/68 707/772 |

FOREIGN PATENT DOCUMENTS

| | | |
|---|---|---|
| JP | 2003-295893 A | 10/2003 |
| JP | 2004-12653 A | 1/2004 |

(Continued)

OTHER PUBLICATIONS

Kudo et al., "Applying Conditional Random Fields to Japanese Morphological Analysis", ENLP 2004, pp. 230-237, Nara Institute of Science and Technology, Barcelona, Spain.

(Continued)

*Primary Examiner* — Feng-Tzer Tzeng
(74) *Attorney, Agent, or Firm* — Crowell & Moring LLP

(57) ABSTRACT

To assign an appropriate pronunciation to a word or phrase having a unique pronunciation or a word or phrase having a pronunciation incorrectly used by a user, a terminal device divides a first word or phrase indicated by a first recognition result acquired from a speech recognition server into morphemes and assigns a pronunciation to each of the morphemes, and divides a second word or phrase indicated by a second recognition result acquired from a speech recognition module into morphemes. Further, the terminal device selects, for a morpheme having the same character string as that of any one of the morphemes forming the second word or phrase among the morphemes forming the first word or phrase, a pronunciation of the morpheme indicated by the second recognition result.

9 Claims, 9 Drawing Sheets

(51) Int. Cl.
    *G10L 15/02*     (2006.01)
    *G10L 15/187*     (2013.01)
    *G10L 15/32*     (2013.01)
    *G06F 40/232*     (2020.01)
    *G10L 15/19*     (2013.01)

(52) U.S. Cl.
    CPC ............ *G06F 40/232* (2020.01); *G10L 15/19* (2013.01); *G10L 15/30* (2013.01); *G10L 15/32* (2013.01)

(56) References Cited

FOREIGN PATENT DOCUMENTS

| | | |
|---|---|---|
| JP | 2010-85536 A | 4/2010 |
| JP | 2012-88370 A | 5/2012 |
| JP | 2013-88477 A | 5/2013 |
| JP | 2015-143866 A | 8/2015 |

OTHER PUBLICATIONS

"MeCab: Yet Another Part-of-Speech and Morphological Analyzer", MeCab, http://taku910.github.io/mecab/, Feb. 8, 2013, Japan (eight (8) pages).

* cited by examiner

FIG. 8

| No. | RECOGNITION RESULT | SCORE | RESULT OF MORPHOLOGICAL ANALYSIS | SELECTED MORPHEME AND PRONUNCIATION |
|---|---|---|---|---|
| 1 | 札幌アサホテル (SAPPORO ASA HOTEL) (さっぽろあさほてる (SAPPORO ASA HOTERU)) | 0.65 | "札幌 (さっぽろ (SAPPORO))" "アサ (あさ (ASA))" "ホテル (ほてる (HOTERU))" | "札幌 (さっぽろ (SAPPORO))" "ホテル (ほてる (HOTERU))" |
| 2 | AKAプラザホテル (AKA PLAZA HOTEL) (あかぷらざほてる (AKA PURAZA HOTERU)) | 0.62 | "AKA (あか (AKA))" "プラザ (ぷらざ (PURAZA))" "ホテル (ほてる (HOTERU))" | "AKA (あか (AKA))" |
| 3 | 札幌キューホテル (SAPPORO KYŪ HOTEL) (さっぽろきゅーほてる (SAPPORO KYŪ HOTERU)) | 0.46 | "札幌 (さっぽろ (SAPPORO))" "キュー (きゅー (KYŪ))" "ホテル (ほてる (HOTERU))" | |
| 4 | 札幌AKAホテル (SAPPORO AKA HOTEL) (さっぽろえいけいえーほてる (SAPPORO EIKEIEI HOTERU)) | 0.32 | "札幌 (さっぽろ (SAPPORO))" AKA (えいけいえー (EIKEIEI))" "ホテル (ほてる (HOTERU))" | |
| ⋮ | ⋮ | ⋮ | ⋮ | |

801 802 803 804 805

SPEECH RECOGNITION SYSTEM, TERMINAL DEVICE, AND DICTIONARY MANAGEMENT METHOD

CLAIM OF PRIORITY

This application claims the priority based on the Japanese Patent Application No. 2017-132708 filed on Jul. 6, 2017. The entire contents of which are incorporated herein by reference for all purpose.

BACKGROUND OF THE INVENTION

The present invention relates to a speech recognition system, a terminal device, and a dictionary management method.

In recent years, some terminal devices such as a smartphone and a car navigation device have a speech input function that uses a speech recognition engine installed on a server side. The speech recognition engine on the server side can make use of more abundant computer resources (for example, arithmetic processing speed and storage capacity) than those of the terminal device. With such resources, the speech recognition engine on the server side is potentially capable of recognizing a wide range of words and phrases, and is also potentially capable of accurately recognizing speeches that are input under various sound environments.

However, the speech recognition engine on the server side cannot be used under an environment in which data communication to/from the terminal device cannot be established, for example, in a depopulated area or inside a tunnel. Thus, it is also possible to provide a system configured such that a speech recognition engine is installed also on the terminal device side and, depending on the situation, speech recognition processing is assigned to the terminal device side or the server side.

In Japanese Patent Laid-open Publication No. 2013-88477, the following descriptions are given: "The assignment determination module 102 determines whether or not the analyzed input mode is a corresponding item selection mode (Step 104). When the current input mode is the corresponding item selection mode, an affirmative determination is made. Next, the speech recognition processor 100 built into the in-vehicle device 1 performs speech recognition processing on a user's speech collected by the microphone 22 (Step 106)." and "Meanwhile, when the current input is a text input mode, a negative determination is made in the determination of Step 104. Next, the speech data transmitter 56 transmits speech data, which is obtained by compressing the speech input from the microphone 22 by the compression processor 26, to the server 2 via the network 3, and requests the server 2 to cause the speech recognition processor 200 included therein to perform speech recognition processing on the speech data (Step 110)."

The speech recognition engine installed on the terminal device is, because of limited computer resources of the terminal device, capable of recognizing fewer words and phrases than the speech recognition engine on the server side. Meanwhile, the speech recognition engine on the server side can be maintained more freely than the speech recognition engine on the terminal device, and hence new words and phrases can be easily added to its speech recognition dictionary. Therefore, there are a large number of words and phrases that can be correctly recognized by the speech recognition engine on the server side but cannot be recognized by the speech recognition engine on the terminal device side. Such words and phrases are not recognized by the terminal device under an environment in which the speech recognition engine on the server side cannot be used, and hence a user of the terminal device suffers inconvenience.

In view of this, when words and phrases that are frequently used by the user among words and phrases that have been recognized by the speech recognition engine on the server side are added to the speech recognition dictionary on the user's terminal device side, words and phrases that can be recognized on the terminal device side by speech recognition can be increased.

In general, a recognition result acquired from the speech recognition engine on the server side is a character string written as text. Therefore, in order to register the recognition result obtained by the server in the speech recognition dictionary of the terminal device, the terminal device is required to have a pronunciation assignment function of assigning a pronunciation to a corresponding text character string.

However, the pronunciation assignment function has the following problems. Many proper nouns, for example, geographical names, have a unique pronunciation. For example, a Kanji character string " 御所 ", which represents "Gose" of Gose City of Nara Prefecture in Japan, is pronounced "gose" rather than "gosho" as read as a Japanese common noun meaning "imperial palace" in Japanese (pronunciations of Japanese words and phrases are hereinafter written in italics). Thus, the pronunciation assignment function cannot always assign a correct pronunciation to a corresponding character string. Further, for example, even in a case where a word or phrase that is assigned a correct pronunciation by the pronunciation assignment function is registered in the speech recognition dictionary, as long as the user utters the word or phrase in an incorrect pronunciation without knowing the correct pronunciation of the word or phrase, the speech recognition capability cannot be expected to be improved.

SUMMARY OF THE INVENTION

The present invention has been made in view of the above-mentioned problems, and has an object to provide a speech recognition system, a terminal device, and a dictionary management method, which are capable of assigning an appropriate pronunciation to a word or phrase having a unique pronunciation or a word or phrase having a pronunciation incorrectly used by a user.

The present invention includes a plurality of measures for solving at least part of the above-mentioned problems, but the following is given as an example thereof.

According to one embodiment of the present invention, there is provided a terminal device including: a communication control module configured to transmit speech data on a user to a speech recognition server and to receive a first recognition result from the speech recognition server; a storage configured to store a speech recognition dictionary for speech recognition; a speech recognition module configured to perform speech recognition on the speech data through use of the speech recognition dictionary to obtain a second recognition result; and a dictionary management module configured to register a first word or phrase indicated by the first recognition result in the speech recognition dictionary. The dictionary management module includes: a morphological analysis module configured to divide the first word or phrase into morphemes and assign a pronunciation to each of the morphemes, and to divide a second word or phrase indicated by the second recognition result into morphemes; and a pronunciation selection module configured to select, for a morpheme having the same character string as a character string of any one of the morphemes forming the second word or phrase among the morphemes forming the first word or phrase, a pronunciation of the morpheme indicated by the second recognition result. The dictionary management module is configured to register the first word or phrase in the speech recognition dictionary together with the pronunciation selected by the pronunciation selection module.

According to the present invention, it is possible to provide the speech recognition system, the terminal device, and the dictionary management method, which are capable of assigning an appropriate pronunciation to a word or phrase having a unique pronunciation or a word or phrase having a pronunciation incorrectly used by a user.

Problems, configurations, and effects other than those described above become apparent from the following description of embodiments of the present invention.

BRIEF DESCRIPTION OF THE DRAWINGS

FIG. 8 is a table for showing an example of each morpheme and its pronunciation selected from N-best recognition results.

DESCRIPTION OF THE PREFERRED EMBODIMENTS

Now, a plurality of embodiments of the present invention are described with reference to the drawings. In each of the embodiments, a specific example in accordance with a basic idea of the present invention is described, but the specific examples are given in order to facilitate understanding of the present invention, and are not to be used for restrictive interpretation of the present invention.

First Embodiment

Figure 1:
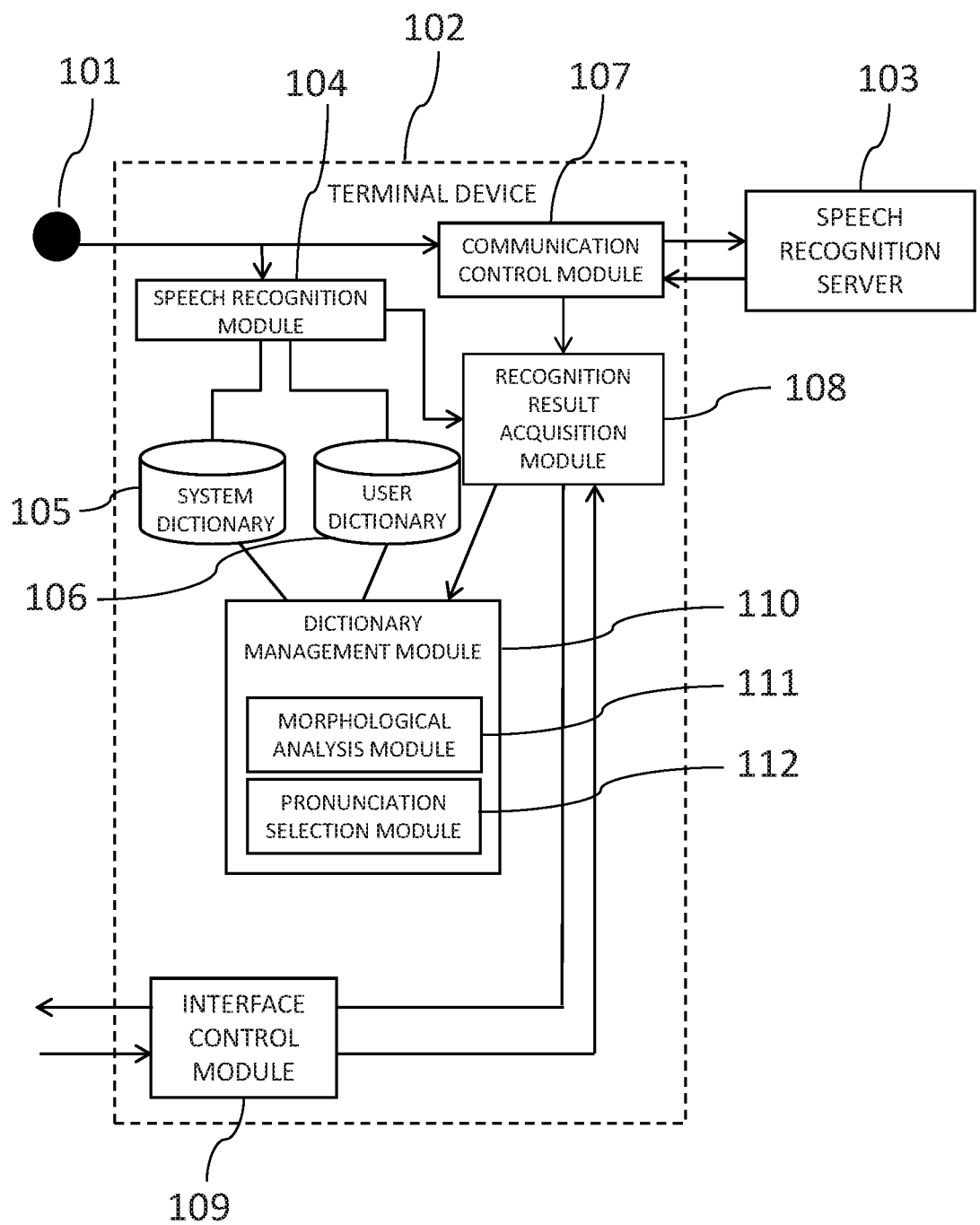
FIG. 1 is a diagram for illustrating an example of a system configuration and a functional configuration of a speech recognition system according to a first embodiment of the present invention.

FIG. 1 is a diagram for illustrating an example of a system configuration and a functional configuration of a speech recognition system according to a first embodiment of the present invention.

The speech recognition system includes a terminal device 102 and a speech recognition server 103. The terminal device 102 and the speech recognition server 103 can communicate to/from each other via a communication network (not shown), for example, a cell phone network or the Internet. A microphone 101 is connected to the inside or outside of the terminal device 102.

The terminal device 102 is an information communication device, for example, a smartphone, a feature phone, a tablet computer, a personal computer (PC), a wearable device, an in-vehicle car navigation device, an in-vehicle audio device, or an in-vehicle electronic control unit (ECU). The speech recognition server 103 is an information communication device, for example, a server computer.

The terminal device 102 has a speech recognition function of recognizing user's speech data that is input via the microphone 101. Further, the terminal device 102 transmits the user's speech data to the speech recognition server 103, to thereby be able to use a speech recognition function of the speech recognition server 103. The speech recognition server 103 has the speech recognition function of recognizing the speech data received from the terminal device 102, and transmits a recognition result obtained by the speech recognition to the terminal device 102.

The terminal device 102 has fewer computer resources (for example, arithmetic processing speed and storage capacity) than those of the speech recognition server 103. As a result, the recognition capability of the speech recognition function of the terminal device 102 is limited to a low level because the number of words and phrases registered in its speech recognition dictionary is small and its processing speed is low. Meanwhile, the recognition capability of the speech recognition function of the speech recognition server 103 is high because the number of words and phrases registered in its speech recognition dictionary is large and its processing speed is high. The speech recognition dictionary of the speech recognition server 103 can increase its vocabulary so as to be capable of recognizing various expressions, for example, popular names and abbreviated names in addition to normal names. Further, the speech recognition dictionary of the speech recognition server 103 can be maintained by centralized control, and hence the words and phrases registered in the speech recognition dictionary can be easily updated in time with, for example, opening of a new facility or release of a new tune. There is, however, a disadvantage in the speech recognition function of the speech recognition server 103 in that the speech recognition function cannot be used when communication between the terminal device 102 and the speech recognition server 103 cannot be established.

In view of this, the terminal device 102 according to the first embodiment has a function of registering in its speech recognition dictionary a word or phrase indicated by a speech recognition result received from the speech recognition server 103. With this function, words and phrases that are highly likely to be used by the user are efficiently registered in the speech recognition dictionary of the terminal device 102, and the usability for the user can thus be improved even under an environment in which the communication to/from the speech recognition server 103 cannot be established.

The terminal device 102 includes a speech recognition module 104, a system dictionary 105 and a user dictionary 106 (those dictionaries may be collectively referred to as "speech recognition dictionary"), a communication control module 107, a recognition result acquisition module 108, an interface control module 109, and a dictionary management module 110. The dictionary management module 110 includes a morphological analysis module 111 and a pronunciation selection module 112.

The speech recognition module 104 receives input of user's speech data via the microphone 101, and executes speech recognition processing on the speech data to output, as a recognition result, for example, a recognized word or phrase (character string), a confidence measure of recognition thereof, and pronunciation data on the word or phrase. Specifically, the speech recognition module 104 refers to the system dictionary 105 and the user dictionary 106 to estimate, from among words and phrases registered in those dictionaries, a word or phrase having a pronunciation most similar to that of the input speech, or a word or phrase expressed by a combination of a plurality of words or phrases that has a pronunciation most similar to that of the input speech. Further, in addition to estimation of a word or phrase, the speech recognition module 104 calculates a confidence measure of the estimation. Such speech recognition processing can be implemented through use of an existing technology, and hence a detailed description thereof is omitted.

The system dictionary 105 is a speech recognition dictionary including a plurality of words and phrases registered in advance. The user dictionary 106 is a speech recognition dictionary for registering a new word or phrase that has been used by the user of the terminal device 102 but is not registered in the system dictionary 105. In those dictionaries, pronunciation data on a word or phrase is registered together with a character string of the word or phrase.

The communication control module 107 communicates to/from the speech recognition server 103 via a communication device (not shown) of the terminal device 102. For example, the communication control module 107 receives input of user's speech data via the microphone 101, and transmits the speech data to the speech recognition server 103. The communication control module 107 may compress the speech data to be transmitted to reduce its data size. Further, for example, the communication control module 107 receives from the speech recognition server 103 a recognition result of speech recognition processing executed on the transmitted speech data, and outputs the recognition result to the recognition result acquisition module 108. The recognition result transmitted from the speech recognition server 103 includes, for example, a recognized word or phrase (character string) and a confidence measure of recognition thereof, and does not include pronunciation data on the word or phrase. It is to be understood that the communication control module 107 may communicate to/from devices other than the speech recognition server 103.

The recognition result acquisition module 108 acquires the recognition result output from the speech recognition module 104. Further, the recognition result acquisition module 108 acquires the recognition result transmitted from the speech recognition server 103 via the communication control module 107. The recognition result acquisition module 108 selects any one of the two acquired recognition results and outputs the selected recognition result to the interface control module 109. The recognition result acquisition module 108 compares, for example, confidence measures included in the respective recognition results, and selects a recognition result having a higher confidence measure.

Further, the recognition result acquisition module 108 outputs to the dictionary management module 110 both of the recognition result obtained by the speech recognition server 103 (hereinafter also referred to as "first recognition result") and the recognition result obtained by the speech recognition module 104 (hereinafter also referred to as "second recognition result").

The interface control module 109 outputs information to the user via an output device (not shown) connected to the terminal device 102, such as a display and a speaker. Further, the interface control module 109 receives input of information from the user via an input device (not shown) of the terminal device 102, such as a software key and a hardware key. The interface control module 109 may present to the user a recognition result input from the recognition result acquisition module 108 and receive from the user an instruction on whether to accept or cancel the recognition result.

The dictionary management module 110 manages the system dictionary 105 and the user dictionary 106. Specifically, the dictionary management module 110 refers to a recognition result selected by the recognition result acquisition module 108 (recognition result obtained by the speech recognition module 104 or recognition result obtained by the speech recognition server 103) to determine whether or not a recognized word or phrase indicated by the recognition result is registered in the system dictionary 105 or the user dictionary 106. The dictionary management module 110 determines whether or not the recognized word or phrase is registered in the system dictionary 105 or the user dictionary 106 by determining whether or not the same character string as that of the recognized word or phrase is registered in the dictionary. When the recognized word or phrase is not registered in the system dictionary 105 or the user dictionary 106, the dictionary management module 110 registers the recognized word or phrase in the user dictionary 106 as a new word or phrase.

When a recognition result selected by the recognition result acquisition module 108 is a recognition result obtained by the speech recognition server 103, the recognition result does not include a pronunciation of a recognized word or phrase. In this case, the dictionary management module 110 uses the morphological analysis module 111 and the pronunciation selection module 112 to assign pronunciation data to the recognized word or phrase. The dictionary management module 110 then registers pronunciation data on the recognized word or phrase that has been assigned thereto, in the user dictionary 106 together with a character string of the word or phrase.

The morphological analysis module 111 performs morphological analysis on a character string of a recognized word or phrase. The morphological analysis is a technology involving dividing text data into units of a language called "morphemes" through use of, for example, grammar and word class information and assigning, to each morpheme, information such as a word class of the morpheme and a pronunciation thereof. As a morphological analysis tool for Japanese, for example, there has been known "MeCab" disclosed in MeCab: Yet Another Part-of-Speech and Morphological Analyzer (http://taku910.github.io/mecab/), and the first embodiment can use this tool. A detailed description of the morphological analysis is omitted.

Specifically, the morphological analysis module 111 performs morphological analysis on a character string of a word or phrase indicated by the first recognition result obtained by the speech recognition server 103 to divide the word or phrase into a plurality of morphemes and assign a pronunciation to each of the morphemes. Further, the morphological analysis module 111 performs morphological analysis on a character string of a word or phrase indicated by the second recognition result obtained by the speech recognition module 104 to divide the word or phrase into a plurality of morphemes (assignment of a pronunciation to each of the morphemes is not always required).

The pronunciation selection module 112 selects a pronunciation to be assigned to each of the morphemes forming the word or phrase indicated by the first recognition result. Specifically, the pronunciation selection module 112 identifies, for each of the morphemes forming the word or phrase indicated by the first recognition result (hereinafter also referred to as "target morpheme"), a morpheme having the same character string as that of the each of the target morphemes from among the morphemes forming the word or phrase indicated by the second recognition result (hereinafter also referred to as "candidate morpheme").

The pronunciation selection module 112 extracts, for a target morpheme for which a candidate morpheme having the same character string has been successfully identified, a pronunciation of the candidate morpheme from the second recognition result (including pronunciation data), and selects the pronunciation as a pronunciation to be assigned to the target morpheme.

The pronunciation selection module 112 extracts, for a target morpheme for which a candidate morpheme having the same character string has failed to be identified, a pronunciation assigned by the morphological analysis module 111, and selects the pronunciation as a pronunciation to be assigned to the target morpheme.

In the manner described above, the dictionary management module 110 acquires a pronunciation of each of the target morphemes selected by the pronunciation selection module 112, and registers in the user dictionary 106 pronunciation data on a recognized word or phrase together with a character string of the word or phrase.

The speech recognition server 103 receives user's speech data from the terminal device 102, and executes speech recognition processing on the speech data. The speech recognition server 103 then transmits as a recognition result, for example, a recognized word or phrase (character string) and a confidence measure of recognition thereof to the terminal device 102. As described above, this recognition result does not include pronunciation data. Specifically, the speech recognition server 103 refers to a speech recognition dictionary (not shown) included in the speech recognition server 103 to estimate, from among words and phrases registered in the dictionary, a word or phrase having a pronunciation most similar to that of the input speech, or a word or phrase expressed by a combination of a plurality of words or phrases that has a pronunciation most similar to that of the input speech. Further, in addition to the estimation of a word or phrase, the speech recognition server 103 calculates a confidence measure of the estimation. Such speech recognition processing can be implemented through use of an existing technology, and hence a detailed description thereof is omitted.

In the speech recognition dictionary included in the speech recognition server 103, a plurality of words and phrases are registered in advance. Further, a new word or phrase is automatically added to the speech recognition dictionary by, for example, an administrator or a program. Further, the words and phrases registered in the speech recognition dictionary can be automatically updated by, for example, the administrator or a program.

The terminal device 102 can be implemented by, for example, a computer including an arithmetic device, a main storage device, an external storage device, a communication device, an input device, an output device, and other components. The arithmetic device is a device, for example, a central processing unit (CPU). The main storage device is a storage device, for example, a random access memory (RAM). The external storage device is a storage device, for example, a hard disk drive, a solid state drive (SSD), or a flash read-only memory (ROM). The communication device is a device configured to transmit and receive information, which includes a communication device configured to perform wired communication via a network cable and a communication device configured to perform wireless communication via an antenna. The input device is a device configured to receive information that is input, which includes, for example, a keyboard, a pointing device such as a mouse, a touch panel, and a microphone. The output device is a device configured to output information to be output, which includes, for example, a display, a printer, and a speaker.

Each of the functions of the terminal device 102 illustrated in FIG. 1 (those functions can be referred to as one controller) can be implemented by, for example, the arithmetic device executing a predetermined application program. This application program is stored in, for example, the main storage device or the external storage device, loaded onto the main storage device for its execution, and executed by the arithmetic device. The speech recognition dictionary is, for example, stored in a storage of at least one of the main storage device or the external storage device. The speech recognition server 103 can also be implemented by such a computer as described above.

Figure 2:
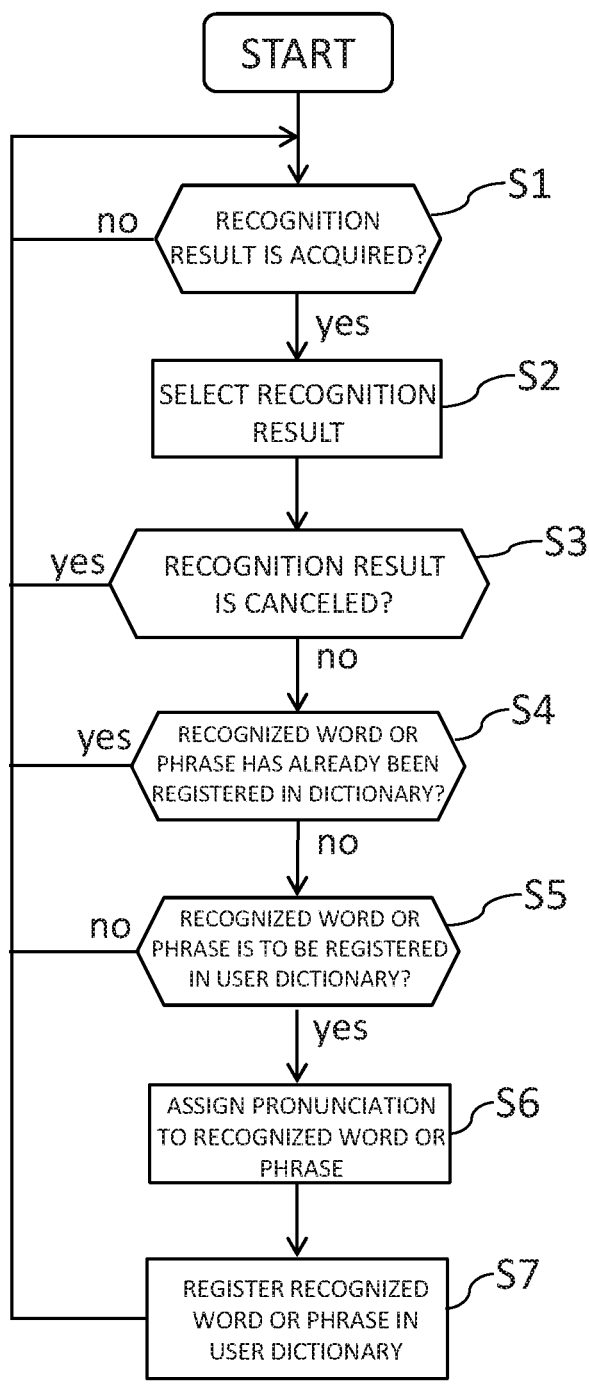
FIG. 2 is a flowchart for illustrating an example of speech recognition processing and recognized word-or-phrase registration processing to be executed by a terminal device according to the first embodiment.

FIG. 2 is a flowchart for illustrating an example of speech recognition processing and recognized word-or-phrase registration processing to be executed by the terminal device according to the first embodiment. This flowchart is an illustration of processing to be executed after speech data is input and speech recognition processing is executed on the speech data. It is assumed that the communication between the terminal device 102 and the speech recognition server 103 has been established.

First, the recognition result acquisition module 108 determines whether or not a speech recognition result of the input speech data is acquired (Step S1). Specifically, the recognition result acquisition module 108 determines whether or not the recognition result is acquired from each of the speech recognition module 104 and the speech recognition server 103. When it is determined that the two recognition results are not acquired (Step S1: NO), the recognition result acquisition module 108 continues the processing of Step S1.

When it is determined that the two recognition results are acquired (Step S1: YES), the recognition result acquisition module 108 selects one of the recognition results (Step S2). Specifically, the recognition result acquisition module 108 compares confidence measures included in the two recognition results acquired in Step S1 to select a recognition result having a higher confidence measure. A case in which a range of the confidence measure is from the minimum value of 0 to the maximum value of 1 is considered. For example, when the recognition result acquired from the speech recognition module 104 is "東京国際空港 (meaning 'Tokyo International Airport')" (confidence measure: 0.92) and the recognition result acquired from the speech recognition server 103 is "東京国際空港 (Tokyo InternationalAirport)" (confidencemeasure: 0.97), there cognition result having a higher confidence measure is selected although both of the recognition results have a high confidence measure. Further, for example, when the recognition result acquired from the speech recognition module 104 is "成田国際空港 (meaning 'Narita International Airport')" (confidence measure: 0.32) and the recognition result acquired from the speech recognition server 103 is "

セントレア国際空港 (meaning 'Centrair International Airport')" (confidence measure: 0.94), although those confidence measures are confidence measures for different phrases, it is highly likely that the recognition result obtained by the speech recognition module 104 is incorrect, and hence the recognition result having a higher confidence measure is selected.

When the communication between the terminal device 102 and the speech recognition server 103 is not established, the recognition result acquisition module 108 determines in Step S1 whether or not the recognition result is acquired from the speech recognition module 104, and in Step S2, selects the recognition result obtained by the speech recognition module 104 irrespective of its confidence measure.

Next, the recognition result acquisition module 108 determines whether or not the selected recognition result is canceled (Step S3). Specifically, the interface control module 109 presents a word or phrase indicated by the recognition result selected in Step S2 (or operation command corresponding to the word or phrase) to the user via the display or speaker and receives selection of whether to accept or cancel the word or phrase (or corresponding operation command) from the user via the input device. The interface control module 109 may receive correction of the presented word or phrase (or corresponding operation command) from the user.

When the interface control module 109 receives selection of canceling the word or phrase, the recognition result acquisition module 108 determines that the recognition result is canceled (Step S3: YES), and returns the processing to Step S1 to execute the processing on the next speech data.

When the interface control module 109 receives selection of accepting the word or phrase, the recognition result acquisition module 108 determines that the recognition result is accepted (Step S3: NO), and advances the processing to Step S4. At this time, the recognition result acquisition module 108 outputs to the dictionary management module 110 the recognition result that is selected in Step S2 and is accepted in Step S3. When the word or phrase is corrected in Step S3, the recognition result acquisition module 108 is only required to output the corrected recognition result to the dictionary management module 110. When the word or phrase (or corresponding operation command) presented to the user is accepted, a processor (not shown) of the terminal device 102 may execute a function associated with the accepted word or phrase (or corresponding operation command).

Next, the dictionary management module 110 determines whether or not a recognized word or phrase has already been registered in the speech recognition dictionary (Step S4). Specifically, the dictionary management module 110 refers to the recognition result output from the recognition result acquisition module 108 in Step S3 to determine whether or not the word or phrase indicated by the recognition result is registered in the system dictionary 105 or the user dictionary 106. When the recognition result is a recognition result obtained by the speech recognition module 104, a recognized word or phrase indicated by the recognition result is registered in the system dictionary 105 or the user dictionary 106. Meanwhile, when the recognition result is a recognition result obtained by the speech recognition server 103, a recognized word or phrase indicated by the recognition result is not registered in the system dictionary 105 or the user dictionary 106 in some cases. When it is determined that a recognized word or phrase has already been registered in the system dictionary 105 or the user dictionary 106 (Step S4: YES), the dictionary management module 110 returns the processing to Step S1, and the recognition result acquisition module 108 executes the processing on the next speech data.

When it is determined that a recognized word or phrase has not been registered yet in the system dictionary 105 or the user dictionary 106 (Step S4: NO), the dictionary management module 110 determines whether to register the recognized word or phrase in the user dictionary 106 (Step S5). Specifically, the dictionary management module 110 records the number of times the same recognized word or phrase is determined not to have been registered in Step S4. Then, when the number of times recorded for the recognized word or phrase exceeds a predetermined threshold value, the dictionary management module 110 determines that the recognized word or phrase is to be registered in the user dictionary 106. In this manner, it is possible to prevent a word or phrase that has been recognized only a small number of times (that is, a word or phrase estimated to be used less frequently) from being registered immediately in the user dictionary 106.

The determination method to be used in Step S5 is not limited to the above-mentioned example. For example, the dictionary management module 110 may refer to a confidence measure of the recognized word or phrase. Then, when the confidence measure has a value larger than a predetermined threshold value, the dictionary management module 110 determines that the recognized word or phrase is to be registered in the user dictionary 106. In this manner, it is possible to prevent a word or phrase having a low confidence measure of recognition from being registered in the user dictionary 106. It is to be understood that the processing of Step S5 may be omitted so that the dictionary management module 110 registers the recognized word or phrase in the user dictionary 106 without any condition.

When it is determined that the recognized word or phrase is not to be registered in the user dictionary 106 (Step S5: NO), the dictionary management module 110 returns the processing to Step S1, and the recognition result acquisition module 108 executes the processing on the next speech data.

When it is determined that the recognized word or phrase is to be registered in the user dictionary 106 (Step S5: YES), the dictionary management module 110 assigns a pronunciation to the recognized word or phrase (Step S6). Step S6 is described in detail later with reference to FIG. 3.

After the processing of Step S6, the dictionary management module 110 registers the recognized word or phrase in the user dictionary 106 as a new word or phrase (Step S7). Specifically, the dictionary management module 110 registers in the user dictionary 106 pronunciation data on the recognized word or phrase that is assigned thereto in Step S6 together with a character string of the word or phrase. Then, the dictionary management module 110 returns the processing to Step S1, and the recognition result acquisition module 108 executes the processing on the next speech data.

Figure 3:
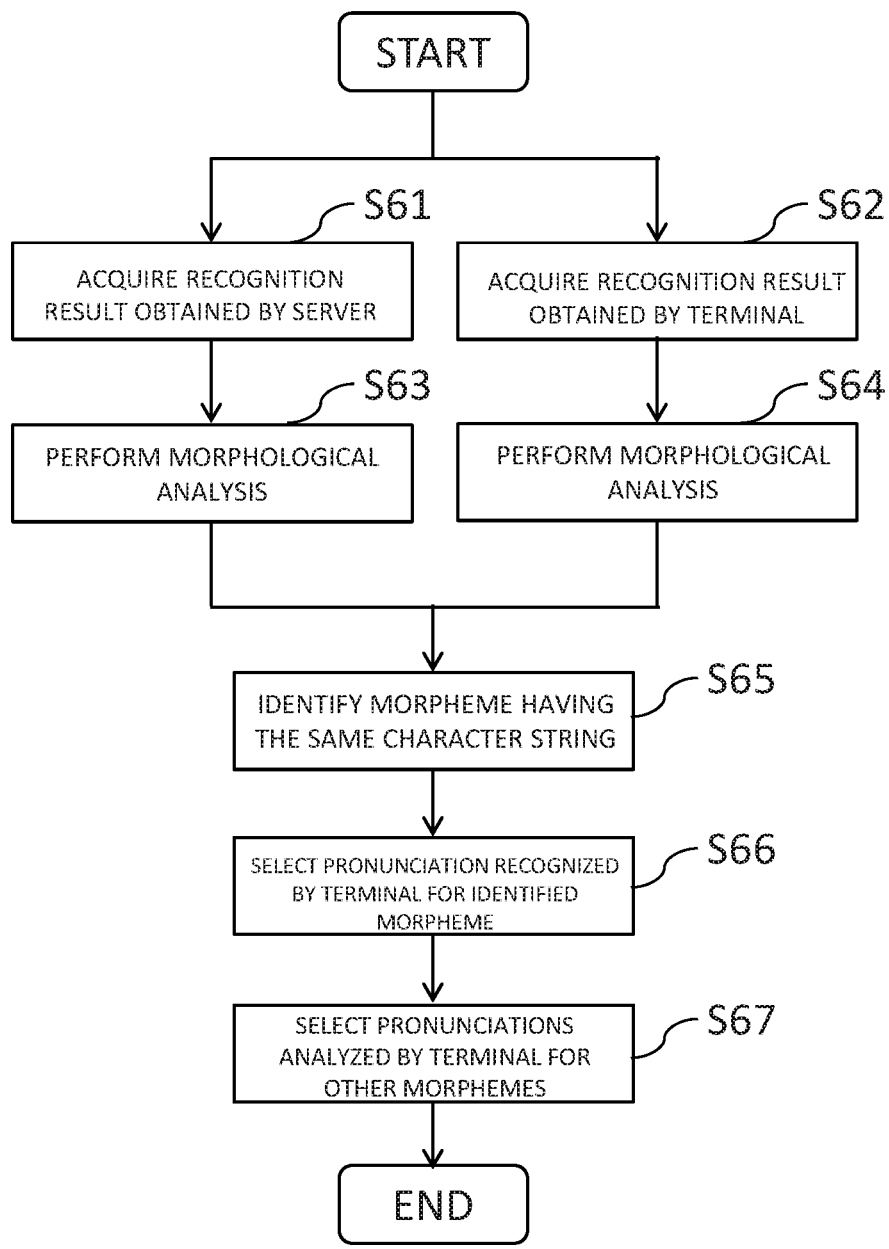
FIG. 3 is a flowchart for illustrating an example of pronunciation assignment processing to be executed by the terminal device according to the first embodiment.

FIG. 3 is a flowchart for illustrating an example of pronunciation assignment processing to be executed by the terminal device according to the first embodiment. This flowchart is an illustration of details of the processing of Step S6 of FIG. 2.

First, the dictionary management module 110 acquires the first recognition result obtained by the speech recognition server 103 from the recognition result acquisition module 108 (Step S61). Further, the dictionary management module 110 acquires the second recognition result obtained by the speech recognition module 104 from the recognition result acquisition module 108 (Step S62).

Next, the morphological analysis module 111 performs morphological analysis on a character string of a word or phrase indicated by the first recognition result acquired in Step S61 to divide the word or phrase into a plurality of morphemes and assign a pronunciation to each of the morphemes (Step S63). Further, the morphological analysis module 111 performs morphological analysis on a character string of the word or phrase indicated by the second recognition result acquired in Step S62 to divide the word or phrase into a plurality of morphemes (Step S64).

Next, the pronunciation selection module 112 identifies, for each of the target morphemes forming the word or phrase indicated by the first recognition result analyzed in Step S63, a morpheme having the same character string as that of the each of the target morphemes from among the candidate morphemes forming the word or phrase indicated by the second recognition result analyzed in Step S64 (Step S65).

Next, the pronunciation selection module 112 extracts, for a target morpheme for which a candidate morpheme having the same character string has been successfully identified in Step S65, a pronunciation of the candidate morpheme from the second recognition result, and selects the pronunciation as a pronunciation to be assigned to the target morpheme (Step S66).

Next, the pronunciation selection module 112 extracts, for a target morpheme for which a candidate morpheme having the same character string has failed to be identified in Step S65, a pronunciation assigned by the morphological analysis module 111 in Step S63, and selects the pronunciation as a pronunciation to be assigned to the target morpheme (Step S67).

The dictionary management module 110 acquires pronunciations of the respective target morphemes that are selected by the pronunciation selection module 112 in Step S66 and Step S67, assigns the pronunciations to the recognized word or phrase, and ends the processing of this flowchart.

Now, a basic idea of pronunciation assignment capable of assigning an appropriate pronunciation to a word or phrase having a unique pronunciation or a word or phrase having a pronunciation incorrectly used by a user is described through use of a specific example.

Figure 4:
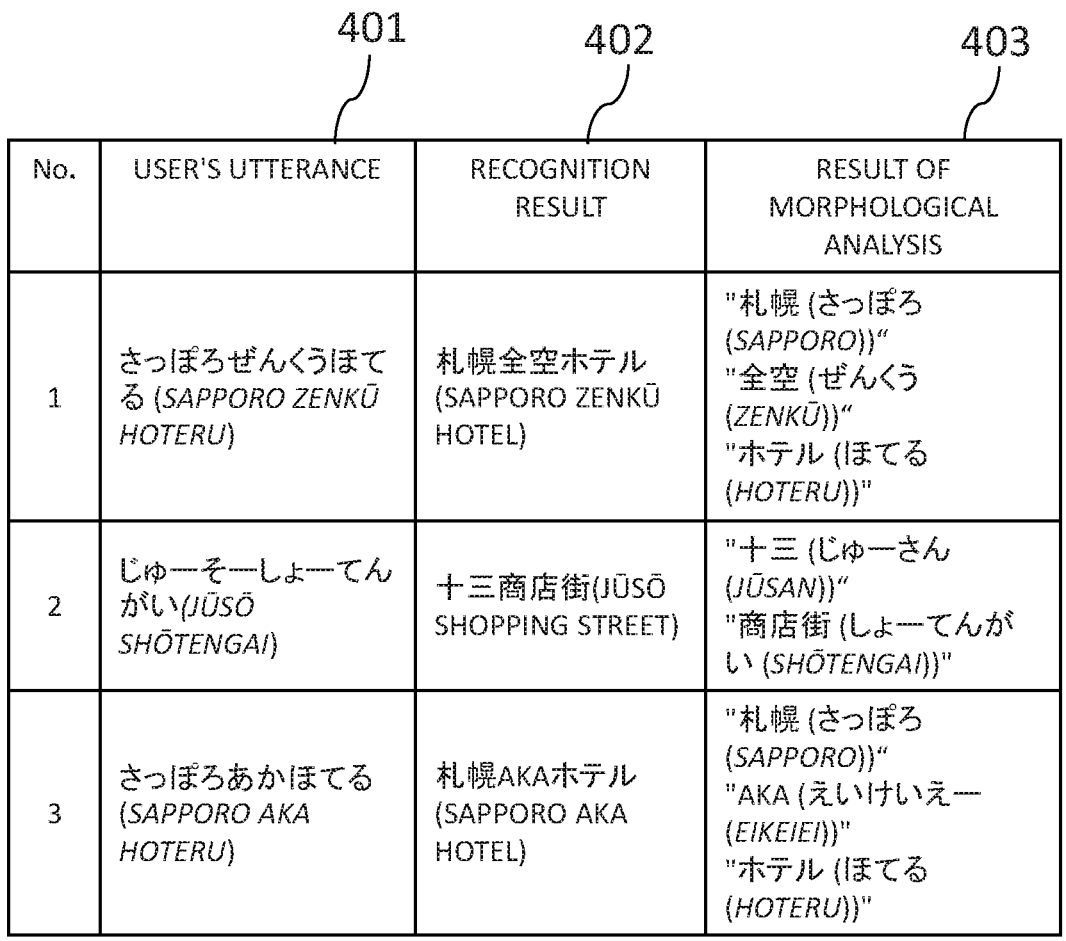
FIG. 4 is a table for showing an example of a pronunciation assigned to a recognized word or phrase by morphological analysis.

FIG. 4 is a table for showing an example of a pronunciation assigned to a recognized word or phrase by morphological analysis. In FIG. 4, details of an utterance given by the user are denoted by reference numeral 401, a text character string of a recognition result acquired from the speech recognition server 103 is denoted by reference numeral 402, and a result of subjecting the text character string to morphological analysis is denoted by reference numeral 403. In each morphological analysis result, a double quotation mark of each morpheme indicates a position at which adjacent morphemes are separated, and a pronunciation of each of the morphemes is enclosed by parentheses. In FIG. 4, examples of No. 1 to No. 3 are shown.

The example of No. 1 is a case in which a morphological analysis result is correct. In the example of No. 1, there is shown a case in which, for the user's utterance "さっぽろぜんくうほてる (sapporo zenkū hoteru)", a recognition result "札幌全空ホテル (meaning 'Sapporo Zenkū Hotel')" is obtained and a morphological analysis result "札幌（さっぽろ (sapporo))" "全空（ぜんくう (zenkū))" "ホテル（ほてる (hoteru))" is obtained. After the word "札幌全空ホテル (Sapporo Zenkū Hotel)" indicated by the recognition result and the pronunciation "さっぽろぜんくうほてる (sapporo zenkū hoteru)" indicated by the morphological analysis result are added to the user dictionary 106 together, a correct recognition result "札幌全空ホテル (Sapporo Zenkū Hotel)" can be obtained for the user's utterance "さっぽろぜんくうほてる (sapporo zenkū hoteru)" by the speech recognition module 104 of the terminal device 102.

The example of No. 2 is a case in which a morphological analysis result is incorrect. In the example of No. 2, there is shown a case in which, for the user's utterance "じゅーそーしょーてんがい (jūsō shōtengai)", a recognition result "十三商店街 (meaning 'Jūsō Shopping Street')" is obtained and a morphological analysis result "十三（じゅーさん (jūsan))" "商店街（しょーてんがい (shōtengai))" is obtained. Although the pronunciation "じゅーそー (jūsō)" should originally be assigned to "十三 (Jūsō)", the pronunciation "じゅうさん (jūsan)" as read as a common noun meaning "thirteen" in Japanese is incorrectly assigned thereto.

The example of No. 3 is a case in which the user does not know a correct pronunciation. In the example of No. 3, there is shown a case in which, for the user's utterance "さっぽろあかほてる (sapporo aka hoteru)", a recognition result "札幌 AKA ホテル" (meaning 'Sapporo AKA Hotel') is obtained and a morphological analysis result "札幌（さっぽろ (sapporo))" "AKA（えいけいえー (eikeiei))" "ホテル（ほてる (hoteru))" is obtained. Although a correct pronunciation of "AKA" is "えいけいえー (eikeiei)", the user utters "さっぽろあかほてる (sapporo aka hoteru)" without knowing the correct pronunciation, but the correct pronunciation "さっぽろえ いけいえーほてる (sapporo eikeiei hoteru)" is assigned by the morphological analysis.

In any of the cases of the examples of No. 2 and No. 3, the difference arises between the user's actual utterance and the pronunciation assigned by the morphological analysis. A basic idea of resolving such a difference is described with reference to FIG. 5.

Figure 5:
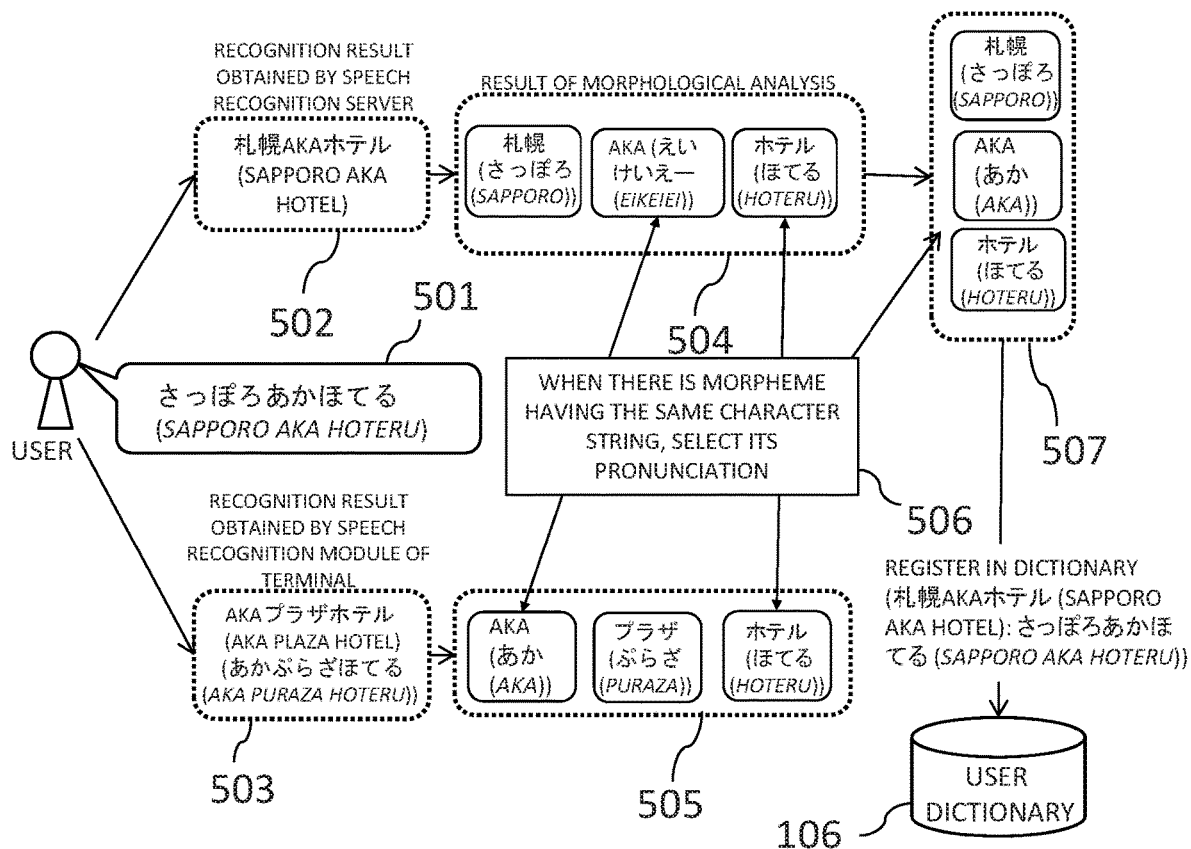
FIG. 5 is a schematic diagram for illustrating an example of assignment of a pronunciation to a recognized word or phrase in the first embodiment.

FIG. 5 is a schematic diagram for illustrating an example of assignment of a pronunciation to a recognized word or phrase in the first embodiment.

In the example of FIG. 5, the user utters "さっぽろあかほてる (sapporo aka hoteru)" (501). Then, the recognition result "札幌 AKA ホテル (Sapporo AKA Hotel)" is acquired from the speech recognition server 103 (502), and the recognition result "AKA プラザホテル (meaning 'AKA Plaza Hotel')" is acquired from the speech recognition module 104 (503).

The recognition result (502) acquired from the speech recognition server 103 includes the text character string, but does not include the pronunciation. Meanwhile, the recognition result (503) acquired from the speech recognition module 104 includes the pronunciation because the speech recognition module 104 can refer to the speech recognition dictionary. In this case, the pronunciation "あかぷらざほてる (aka puraza hoteru)" is assigned to "AKA プラザホテル (AKA Plaza Hotel)".

When morphological analysis is performed on the recognition result (502) acquired from the speech recognition server 103, a pronunciation of each of the morphemes is acquired (504). In this case, the recognition result is divided into three morphemes of "札幌 (Sapporo)", "AKA", and "ホテル (hotel)", and pronunciations "さっぽろ (sapporo)", "えいけいえー (eikeiei)", and "ほてる (hoteru)" are assigned to the respective morphemes.

Similarly, morphological analysis is also performed on the recognition result (503) acquired from the speech recognition module 104 (505). In this case, the recognition result is divided into three morphemes of "AKA", "プラザ (plaza)", and "ホテル (hotel)". At this time, the pronunciation obtained in the recognition result (503) is used as a pronunciation of each of the morphemes. Therefore, it can be considered that the pronunciations "あか (aka)", "ぷら ざ (puraza)", and "ほてる (hoteru)" are assigned to the respective morphemes.

Subsequently, for each of the morphemes included in the morphological analysis result (504), it is determined whether or not a morpheme having the same character string as that of the each of the morphemes exists in the morphological analysis result (505), and a pronunciation of the morpheme having the same character string is extracted (506). In this case, two morphemes of "AKA" and "ホテル (hotel)" are extracted. For those morphemes, pronunciations included in the morphological analysis result (505) based on the recognition result (503) are selected. Specifically, as the pronunciation of "AKA", "あか (aka)" is selected in place of "え いけいえー (eikeiei)". As the pronunciation of "ホテル (hotel)", "ほてる (hoteru)", which is the same as that included in the morphological analysis result (504), is selected. Meanwhile, as the pronunciation of " 札幌 (Sapporo)", for which the morpheme having the same character string has failed to be found, "さっぽろ (sapporo)" included in the morphological analysis result (504) is selected as it is.

In the manner described above, after the pronunciation of a part of the morphemes included in the morphological analysis result (504) is changed to another pronunciation, the pronunciation of " 札幌 AKA ホテル (Sapporo AKA Hotel)" is set to "さっぽろあかほてる (sapporoaka hoteru)" (507). Then, this set of the character string "札幌AKA ホテル (Sapporo AKA Hotel)" and the pronunciation "さっぽ ろあかほてる (sapporo aka hoteru)" is registered in the user dictionary 106 as a new word or phrase. After that, for the user's utterance " さっぽろあかほてる (sapporo aka hoteru)", the speech recognition module 104 of the terminal device 102 can now acquire a more appropriate recognition result " 札幌AKA ホテル (Sapporo AKA Hotel)".

In the above, the first embodiment of the present invention has been described. When the terminal device 102 according to the first embodiment registers a new word or phrase that does not exist in the speech recognition dictionary of the terminal device 102 based on a recognition result obtained by the speech recognition server 103, the terminal device 102 refers to pronunciation information acquired from a recognition result obtained by the speech recognition module 104. In this manner, an appropriate pronunciation can be assigned to a word or phrase having a unique pronunciation or to a word or phrase having a pronunciation incorrectly used by the user, and a new word or phrase obtained as a result can be registered in the speech recognition dictionary.

Second Embodiment

In the first embodiment, the dictionary management module 110 refers to a single recognition result obtained by the speech recognition module 104 to correct a pronunciation of a target morpheme. In this case, when a recognition result obtained by the speech recognition module 104 does not include a morpheme having the same character string as that of a target morpheme, the pronunciation of the target morpheme cannot be corrected. In a second embodiment of the present invention, a plurality of recognition results obtained by the speech recognition module 104 are referred to. In the following, differences from the first embodiment are mainly described.

In general speech recognition processing, a plurality of possible character strings are generated as candidates for a character string corresponding to an input speech. Then, a score (the above-mentioned confidence measure) associated with each of the possible character strings are referred to, and a possible character string having the highest score is output as a recognition result. The top N possible character strings having the highest to N-th highest scores is called "N-best" recognition results.

The speech recognition module 104 generates N N-best recognition results, and outputs those recognition results to the recognition result acquisition module 108 together with their scores. The speech recognition module 104 may obtain N recognition results by setting a constant as N, or may set the number of recognition results whose scores are equal to or higher than a given value as N.

In Step S2 of FIG. 2, the recognition result acquisition module 108 compares a recognition result having the highest score among the N recognition results and a recognition result acquired from the speech recognition server 103 with each other to select any one of the recognition results.

In Step S62 of FIG. 3, the dictionary management module 110 acquires from the recognition result acquisition module 108 N N-best second recognition results obtained by the speech recognition module 104. In Step S64, the morphological analysis module 111 performs morphological analysis on each of the N second recognition results acquired in Step S62.

In Step S65 of FIG. 3, the pronunciation selection module 112 identifies, for each of the target morphemes forming the word or phrase indicated by the first recognition result analyzed in Step S63, a morpheme having the same character string as that of the each of the target morphemes from among the candidate morphemes forming each of the words or phrases indicated by the N second recognition results analyzed in Step S64. In Step S66, when a plurality of candidate morphemes having the same character string are identified in Step S65, the pronunciation selection module 112 extracts a pronunciation of the candidate morpheme from a recognition result having the highest score (having the highest rank), and selects the pronunciation as a pronunciation to be assigned to the target morpheme.

In the following, a basic idea of pronunciation assignment that uses N-best recognition results is described through use of a specific example.

Figure 6:
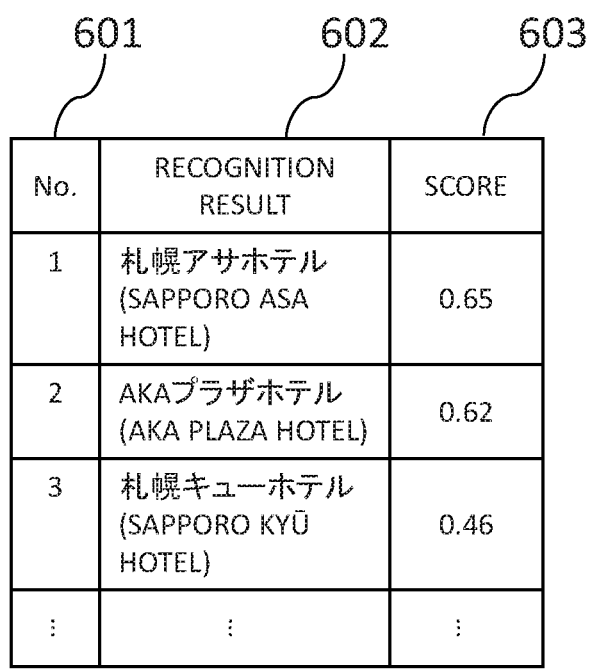
FIG. 6 is a table for showing an example of N-best recognition results.

FIG. 6 is a table for showing an example of N-best recognition results. In FIG. 6, N-best recognition results obtained by the speech recognition module 104 are shown. In FIG. 6, a rank of the recognition result is denoted by reference numeral 601, a recognition result is denoted by reference numeral 602, and a score is denoted by reference numeral 603.

Figure 7:
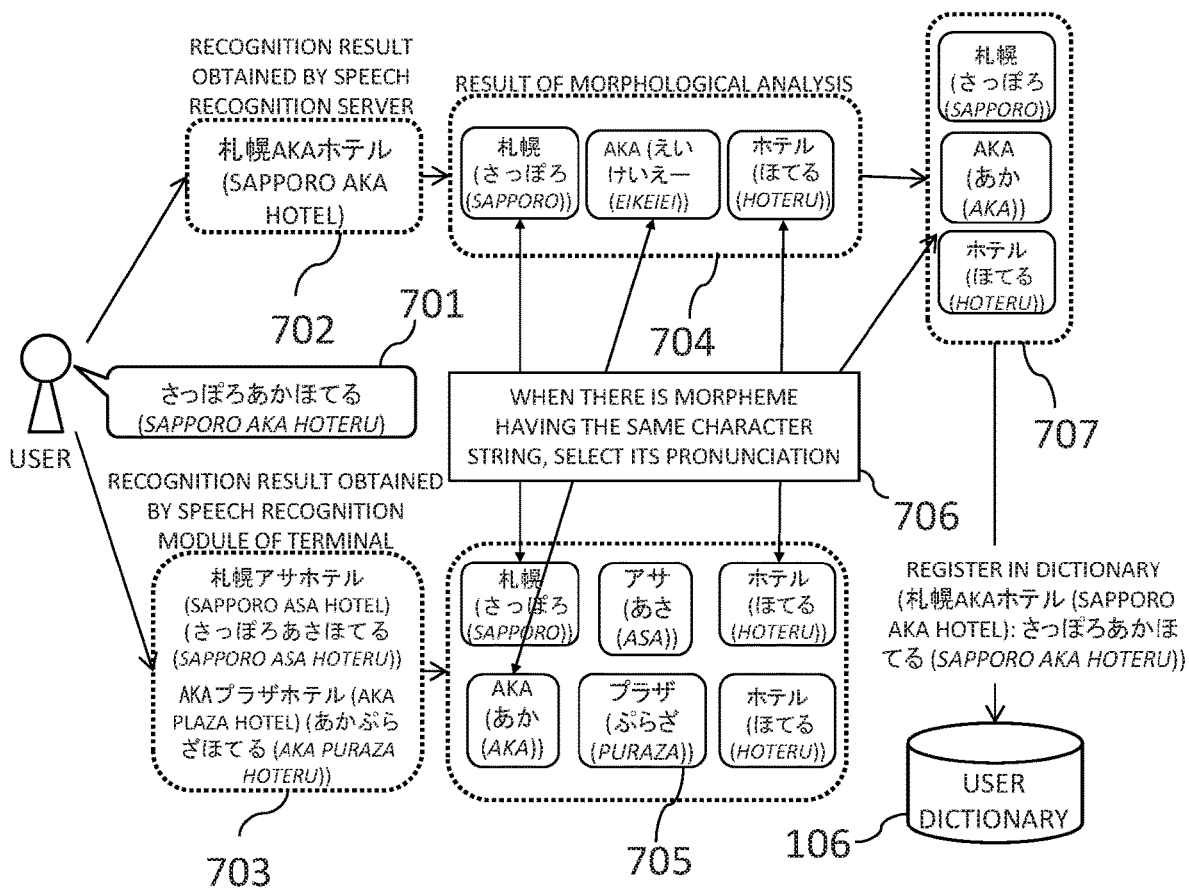
FIG. 7 is a schematic diagram for illustrating an example of assignment of a pronunciation to a recognized word or phrase in a second embodiment of the present invention.

FIG. 7 is a schematic diagram for illustrating an example of assignment of a pronunciation to a recognized word or phrase in the second embodiment. In FIG. 7, a case in which N=2 is shown.

In the example of FIG. 7, the user utters " さっぽろあかほて る (sapporo aka hoteru)" (701). Then, the recognition result "札幌AKA ホテル (Sapporo AKA Hotel)" is acquired from the speech recognition server 103 (702), and two recognition results "札幌 アサホテル (meaning 'Sapporo Asa Hotel')" and "AKA プラザホテル (AKA Plaza Hotel)" are acquired from the speech recognition module 104 (703).

The recognition result (702) acquired from the speech recognition server 103 includes the text character string, but does not include the pronunciation. Meanwhile, the two recognition results (703) acquired from the speech recognition module 104 include the respective pronunciations because the speech recognition module 104 can refer to the speech recognition dictionary. In this case, the pronunciation "さっぽろあさほてる (sapporo asa hoteru)" is assigned to "札幌アサホテル (Sapporo Asa Hotel)", and the pronunciation "あかぷらざほてる (aka puraza hoteru)" is assigned to "AKA プラザホテル (AKA Plaza Hotel)".

When morphological analysis is performed on the recognition result (702) acquired from the speech recognition server 103, a pronunciation of each of the morphemes is acquired (704). In this case, the recognition result is divided into three morphemes of "札幌 (Sapporo)", "AKA", and "ホテル (hotel)", and the pronunciations "さっぽろ (sapporo)", "えいけいえー (eikeiei)", and "ほてる (hoteru)" are assigned to the respective morphemes.

Similarly, morphological analysis is also performed on each of the two recognition results (703) acquired from the speech recognition module 104 (705). In this case, "札幌アサホテル (Sapporo Asa Hotel)" is divided into three morphemes of "札幌 (Sapporo)", "アサ (Asa)", and "ホテル (hotel)", and "AK プラザホテル (AKA Plaza Hotel)" is divided into three morphemes of "AKA", "プラザ (plaza)", and "ホテル (hotel)". At this time, the pronunciation obtained in one of the recognition results (703) is used as a pronunciation of each of the morphemes. Therefore, it can be considered that the pronunciations "さっぽろ (sapporo)", "あさ (asa)", and "ほてる (hoteru)" are assigned to the respective morphemes "札幌 (Sapporo)", "アサ (Asa)", and "ホテル (hotel)", an the pronunciations "あか (aka)", "ぷらざ (puraza)", and "ほてる (hoteru)" are assigned to the respective morphemes "AKA", "プラザ (plaza)", and "ホテル (hotel)".

Subsequently, for each of the morphemes included in the morphological analysis result (704), it is determined whether or not a morpheme having the same character string as that of the each of the morphemes exists in the morphological analysis result (705), and a pronunciation of the morpheme having the same character string is extracted (706). In this case, three morphemes of "札幌 (Sapporo)", "AKA", and "ホテル (hotel)" are extracted. For those morphemes, pronunciations included in the morphological analysis result (705) based on the recognition result (703) are selected. That is, as the pronunciation of "札幌 (Sapporo)", "さっぽろ (sapporo)", which is the same as that included in the morphological analysis result (704) is selected. As the pronunciation of "AKA", "あか (aka)" is selected in place of "えいけいえー (eikeiei)". As the pronunciation of "ホテル (hotel)", "ほてる (hoteru)", which is the same as that included in the morphological analysis result (704), is selected.

In the manner described above, after the pronunciation of a part of the morphemes included in the morphological analysis result (704) is changed to another pronunciation, the pronunciation of "札幌AKAホテル (Sapporo AKA Hotel)" is set to "さっぽろあかほてる (sapporo aka hoteru)" (707). Then, this set of the character string "札幌AKAホテル (Sapporo AKA Hotel)" and the pronunciation "さっぽろあかほてる (sapporo aka hoteru)" is registered in the user dictionary 106 as a new word or phrase. After that, for the user's utterance "さっぽろあかほてる (sapporo aka hoteru)", the speech recognition module 104 of the terminal device 102 can now acquire a more appropriate recognition result "札幌AKAホテル (Sapporo AKA Hotel)".

In FIG. 7, N is set to 2 in order to simplify the description, but a new word or phrase can also be registered based on a similar idea even when N is equal to or larger than 3.

Further, through acquisition of pronunciations from N-best recognition results, even if "札幌アサホテル (Sapporo Asa Hotel)" has a higher score between two recognition results "札幌アサホテル (Sapporo Asa Hotel)" and "AKA プラザホテル (AKA Plaza Hotel)" obtained by the speech recognition module 104, the pronunciation "あか (aka)" of "AKA" can be acquired.

When pronunciations are acquired from N-best recognition results, a plurality of candidate morphemes having the same character string are identified for a target morpheme in some cases. Such a case is now described.

FIG. 8 is a table for showing an example of each morpheme and its pronunciation selected from N-best recognition results. In FIG. 8, a rank of a recognition result is denoted by reference numeral 801, a recognition result is denoted by reference numeral 802, a score is denoted by reference numeral 803, a result of subjecting a recognition result to morphological analysis is denoted by reference numeral 804, and a selected morpheme and pronunciation is denoted by reference numeral 805.

As in the case of FIG. 7, a case is considered in which the morphological analysis result of the recognition result acquired from the speech recognition server 103 is "札幌 (Sapporo)", "AKA", and "ホテル (hotel)". In this case, candidate morphemes having the same character string as that of each target morpheme are "札幌 (Sapporo) (さっぽろ (sapporo))" of No. 1, No. 3, and No. 4, "AKA (あか (aka))" of No. 2, "AKA (えいけいえー (eikeiei))" of No. 4, and "ホテル (hotel) (ほてる (hoteru))" of No. 1 to No. 4. There are a plurality of candidates for each of the target morphemes.

For the target morpheme "札幌 (Sapporo)", all the candidate morphemes have the same pronunciation, and hence the same pronunciation is assigned to the target morpheme irrespective of which of the candidate morphemes is selected. Similarly, also for the target morpheme "ホテル (hotel)", all the candidate morphemes have the same pronunciation, and hence the same pronunciation is assigned to the target morpheme irrespective of which of the candidate morphemes is selected. Meanwhile, for the target morpheme "AKA", there are two candidate morphemes having different pronunciations. The pronunciation of this target morpheme differs depending on which of "AKA (あか (aka))" of No. 2 and "AKA (えいけいえー (eikeiei))" of No. 4 is selected. Thus, in the second embodiment, in order to prevent such a conflict between the pronunciations, when there area plurality of candidate morphemes having the same character string, the pronunciation of a candidate morpheme having a higher score is selected.

In the example of FIG. 8, "札幌 (Sapporo) (さっぽろ (sapporo))" of No. 1 is selected for the target morpheme "札幌 (Sapporo)", "ホテル (hotel) (ほてる (hoteru))" of No. 1 is also selected for the target morpheme "ホテル (hotel)", and "AKA (あか (aka))" of No. 2 is selected for the target morpheme "AKA". As a result, the pronunciation "さっぽろあかほてる (sapporo aka hoteru)" is assigned to "札幌AKAホテル (Sapporo AKA Hotel)".

Third Embodiment

In the first embodiment, when it is determined in Step S4 of FIG. 2 that a recognized word or phrase has already been registered in the system dictionary 105 or the user dictionary 106, the word or phrase is not to be registered in the user dictionary 106. In a third embodiment of the present invention, even in a case where a recognized word or phrase has already been registered in the system dictionary 105 or the user dictionary 106, when a pronunciation of the recognized word or phrase differs from that registered in the dictionary, the word or phrase is to be registered in the user dictionary 106. In the following, differences from the first embodiment are mainly described.

Figure 9:
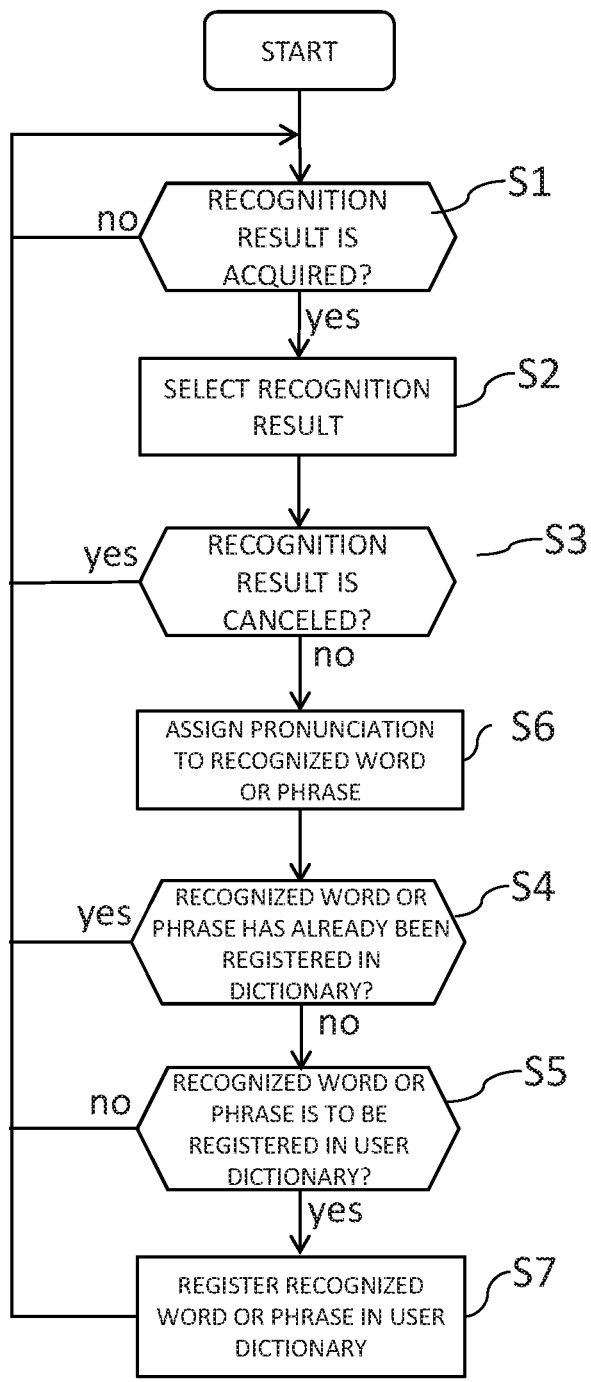
FIG. 9 is a flowchart for illustrating an example of speech recognition processing and recognized word-or-phrase registration processing to be executed by a terminal device according to a third embodiment of the present invention.

FIG. 9 is a flowchart for illustrating an example of speech recognition processing and recognized word-or-phrase registration processing to be executed by the terminal device according to the third embodiment. The flowchart of FIG. 9 differs from that of FIG. 2 in that the processing of Step S6 is inserted between Step S3 and Step S4.

When the recognition result acquisition module 108 determines that the recognition result is accepted (Step S3: NO), the dictionary management module 110 executes the processing of Step S6, and then executes the processing of Step S4. When the recognition result is a recognition result obtained by the speech recognition module 104, a pronunciation has already been assigned to the recognition result, and hence the dictionary management module 110 skips the processing of Step S6 and executes the processing of Step S4. When it is determined that the recognized word or phrase is to be registered in the user dictionary 106 (Step S5: YES), the dictionary management module 110 executes the processing of Step S7.

In Step S4, the dictionary management module 110 determines whether or not a set of the recognized word or phrase and a pronunciation of the word or phrase has been registered in the system dictionary 105 or the user dictionary 106. When it is determined that a set of the recognized word or phrase and a pronunciation of the word or phrase has been registered in the system dictionary 105 or the user dictionary 106 (Step S4: YES), the dictionary management module 110 returns the processing to Step S1. When it is determined that a set of the recognized word or phrase and a pronunciation of the word or phrase has not been registered in the system dictionary 105 or the user dictionary 106 (Step S4: NO), the dictionary management module 110 advances the processing to Step S5.

The present invention is not limited to the embodiments described above, and various modifications can be made to the invention within the scope of the gist of the invention. The respective embodiments and the respective modification examples may be combined appropriately.

For example, in the above-mentioned embodiments, morphological analysis is used as the processing of assigning a pronunciation, but a method of assigning a pronunciation is not limited to this method.

Further, for example, in the above-mentioned embodiments, a recognition result acquired from the speech recognition module 104 is divided into morphemes by the morphological analysis module 111, but the recognition result may be divided by another method. Specifically, the speech recognition dictionary of the terminal device 102 is configured such that a character string of each word or phrase, pronunciation data on the word or phrase, and information on each of the morphemes forming the word or phrase are stored. The speech recognition module 104 is only required to refer to this dictionary to divide a recognized word or phrase into morphemes in speech recognition processing on speech data.

The configuration of the terminal device 102 of FIG. 1 is obtained by classifying the components of the terminal device 102 in accordance with their main processing details in order to facilitate understanding of the configuration of the terminal device 102. The present invention is not limited by how the components are classified and the names thereof. The components of the terminal device 102 may also be classified into a larger number of components in accordance with their processing details. The components may also be classified such that each single component executes more processing. Further, the processing to be executed by each component may be executed by one hardware component, or may be executed by a plurality of hardware components. Further, processing to be executed by each of the components and a function assigned to each component are not limited to those of the above-mentioned example as long as the object and effects of the present invention can be achieved.

The processing units of the flowcharts of FIG. 2, FIG. 3, and FIG. 9 are obtained by dividing the processing in accordance with their main processing details in order to facilitate understanding of the processing to be executed by the terminal device 102. The present invention is not limited by how the processing is divided into processing units and the names thereof. The processing to be executed by the terminal device 102 may also be divided into a larger number of processing units in accordance with their processing details. The processing may also be divided such that each processing unit includes more processing steps. Further, the processing order of each of the flowcharts is not limited to that of the illustrated example as long as the object and effects of the present invention can be achieved.

The embodiments described above are described in detail in order to facilitate understanding of the present invention. The present invention is not necessarily limited to the one including all of the configurations described above. Further, a part of the configurations of a given embodiment may be replaced with the configurations of another embodiment or another modified example. Alternatively, the configurations of another embodiment or another modified example may be added to the configurations of a given embodiment. In addition, other configurations may be added to, may be deleted from, or may replace a part of the configurations of each embodiment.

Some of or all of the configurations, functions, processing units, processing means, and the like described above may be implemented by a processor executing a program for implementing each of the functions. The programs for implementing the functions and information such as tables and files can be put in a memory, in a storage device such as a hard disk drive or a solid state drive (SSD), or in a recording medium such as an IC card, a secure digital (SD) card, or a digital versatile disc (DVD). Control lines or information lines considered to be required for description are illustrated, and not all control lines and information lines required for an actual product are necessarily illustrated.

The present invention can be provided in various forms including a dictionary management method and a computer-readable program as well as the speech recognition system and the terminal device. Further, the present invention is applicable to speech recognition of various languages including English as well as Japanese.

What is claimed is:

1. A terminal device, comprising:
   a communication control module configured to transmit speech data on a user to a speech recognition server and to receive a first recognition result from the speech recognition server;
   a storage configured to store a speech recognition dictionary for speech recognition;
   a speech recognition module configured to perform speech recognition on the speech data through use of the speech recognition dictionary to obtain a second recognition result; and a dictionary management module configured to register a first word or phrase indicated by the first recognition result in the speech recognition dictionary, wherein the dictionary management module includes:
- a morphological analysis module configured to divide the first word or phrase into morphemes and assign a pronunciation to each of the morphemes, and to divide a second word or phrase indicated by the second recognition result into morphemes; and
- a pronunciation selection module configured to identify, for each of the morphemes forming the first word or phrase indicated by the first recognition result, a target morpheme having a same character string as that of one of the morphemes from among the morphemes forming the second word or phrase indicated by the second recognition result, and configured to select a pronunciation for the target morpheme as indicated by the second recognition result, and wherein the dictionary management module is configured to register the first word or phrase in the speech recognition dictionary together with the pronunciation selected by the pronunciation selection module.

2. The terminal device according to claim 1, wherein the pronunciation selection module is configured to select, for a morpheme that has a character string different from any one of character strings of the morphemes forming the second word or phrase among the morphemes forming the first word or phrase, a pronunciation assigned by the morphological analysis module.

3. The terminal device according to claim 1, further comprising a recognition result acquisition module configured to compare the first recognition result and the second recognition result with each other to select any one of the first recognition result and the second recognition result,
wherein, when a selected recognition result is the first recognition result, the dictionary management module registers the first word or phrase in the speech recognition dictionary together with the pronunciation selected by the pronunciation selection module.

4. The terminal device according to claim 1,
wherein the speech recognition module is configured to acquire a plurality of second recognition results,
wherein the morphological analysis module is configured to divide each second word or phrase indicated by a corresponding one of the plurality of second recognition results into morphemes, and
wherein the pronunciation selection module is configured to select, for a morpheme having the same character string as a character string of any one of the morphemes forming each second word or phrase among the morphemes forming the first word or phrase, a pronunciation of the morpheme indicated by a corresponding one of the plurality of second recognition results.

5. The terminal device according to claim 4,
wherein each of the plurality of second recognition results has a rank set thereto, and
wherein the pronunciation selection module is configured to select, for each of the morphemes forming the first word or phrase, when a plurality of morphemes having the same character string as a character string of the each of the morphemes exist in each second word or phrase, a pronunciation of the each of the morphemes indicated by one of the plurality of second recognition results that has a highest rank.

6. The terminal device according to claim 1, wherein, when the first word or phrase is not registered in the speech recognition dictionary, the dictionary management module registers the first word or phrase in the speech recognition dictionary.

7. A terminal device, comprising:
- a communication control module configured to transmit speech data on a user to a speech recognition server and to receive a first recognition result from the speech recognition server;
- a storage configured to store a speech recognition dictionary for speech recognition;
- a speech recognition module configured to perform speech recognition on the speech data through use of the speech recognition dictionary to obtain a second recognition result; and
- a dictionary management module configured to register a first word or phrase indicated by the first recognition result in the speech recognition dictionary, wherein the dictionary management module includes:
- a morphological analysis module configured to divide the first word or phrase into morphemes and assign a pronunciation to each of the morphemes, and to divide a second word or phrase indicated by the second recognition result into morphemes; and
- a pronunciation selection module configured to select, for a morpheme having the same character string as a character string of any one of the morphemes forming the second word or phrase among the morphemes forming the first word or phrase, a pronunciation of the morpheme indicated by the second recognition result, and wherein the dictionary management module is configured to register the first word or phrase in the speech recognition dictionary together with the pronunciation selected by the pronunciation selection module, wherein, when the first word or phrase is not registered in the speech recognition dictionary, the dictionary management module registers the first word or phrase in the speech recognition dictionary, and wherein, even in a case where the first word or phrase is registered in the speech recognition dictionary, when the pronunciation of the first word or phrase differs from a pronunciation registered in the speech recognition dictionary, the dictionary management module registers the first word or phrase in the speech recognition dictionary as a different word or phrase.

8. A speech recognition system, comprising
a speech recognition server configured to perform speech recognition to obtain speech data on a user; and
a terminal device,
wherein the terminal device includes:
- a communication control module configured to transmit speech data to the speech recognition server and to receive a first recognition result from the speech recognition server;
- a storage configured to store a speech recognition dictionary for speech recognition;
- a speech recognition module configured to perform speech recognition on the speech data through use of the speech recognition dictionary to obtain a second recognition result; and
- a dictionary management module configured to register a first word or phrase indicated by the first recognition result in the speech recognition dictionary, wherein the dictionary management module includes:
- a morphological analysis module configured to divide the first word or phrase into morphemes and assign a pronunciation to each of the morphemes, and to divide a second word or phrase indicated by the second recognition result into morphemes; and a pronunciation selection module configured to identify, for each of the morphemes forming the first word or phrase indicated by the first recognition result, a target morpheme having a same character string as that of one of the morphemes from among the morphemes forming the second word or phrase indicated by the second recognition result, and configured to select a pronunciation for the target morpheme as indicated by the second recognition result, and wherein the dictionary management module is configured to register the first word or phrase in the speech recognition dictionary together with the pronunciation selected by the pronunciation selection module.

9. A dictionary management method for a terminal device, comprising:

a first recognition step of transmitting, by a communication control module, speech data on a user to a speech recognition server and receiving a first recognition result from the speech recognition server;

a second recognition step of performing, by a speech recognition module, speech recognition on the speech data through use of a speech recognition dictionary included in the terminal device to obtain a second recognition result; and registering, by a dictionary management module, a first word or phrase indicated by the first recognition result in the speech recognition dictionary, wherein the registering of the first word or phrase includes:

a morphological analysis step of dividing the first word or phrase into morphemes and assigning a pronunciation to each of the morpheme, and dividing a second word or phrase indicated by the second recognition result into morphemes;

identifying, for each of the morphemes forming the first word or phrase indicated by the first recognition result, a target morpheme having a same character string as that of one of the morphemes from among the morphemes forming the second word or phrase indicated by the second recognition result;

selecting a pronunciation for the target morpheme as indicated by the second recognition result; and registering the first word or phrase in the speech recognition dictionary together with the pronunciation selected in the selecting of the pronunciation.

* * * * *